US011898481B2

(12) United States Patent
Brahma

(10) Patent No.: US 11,898,481 B2
(45) Date of Patent: Feb. 13, 2024

(54) SYSTEMS AND METHODS FOR COORDINATED EXHAUST TEMPERATURE CONTROL WITH ELECTRIC HEATER AND ENGINE

(71) Applicant: Cummins Inc., Columbus, IN (US)

(72) Inventor: Avra Brahma, Fishers, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/843,743

(22) Filed: Jun. 17, 2022

(65) Prior Publication Data

US 2022/0316378 A1 Oct. 6, 2022

Related U.S. Application Data

(63) Continuation of application No. 16/829,581, filed on Mar. 25, 2020, now Pat. No. 11,365,662.

(51) Int. Cl.
*F01N 3/20* (2006.01)
*F01N 11/00* (2006.01)
(Continued)

(52) U.S. Cl.
CPC ........... *F01N 3/2013* (2013.01); *F01N 3/105* (2013.01); *F01N 3/2066* (2013.01); *F01N 11/002* (2013.01); *F02D 41/401* (2013.01); *F02D 41/405* (2013.01); *F01N 3/027* (2013.01); *F01N 3/0275* (2013.01); *F01N 3/103* (2013.01); *F01N 3/2006* (2013.01); *F01N 3/208* (2013.01);
(Continued)

(58) Field of Classification Search
CPC combination set(s) only.
See application file for complete search history.

(56) References Cited

U.S. PATENT DOCUMENTS 3,975,951 A 8/1976 Kohama et al.
4,449,362 A 5/1984 Frankenberg et al.
(Continued)

FOREIGN PATENT DOCUMENTS

DE 10 2008 030 307 12/2009
DE 10 2010 025 643 A1 1/2011
(Continued)

OTHER PUBLICATIONS

German Office Action dated Jul. 17, 2023 re Appl No. 102021107168.2, with English translation, 28 pages.

*Primary Examiner* — Binh Q Tran
(74) *Attorney, Agent, or Firm* — FOLEY & LARDNER LLP

(57) ABSTRACT

A system includes an aftertreatment system coupled to an engine, a heater, at least one sensor configured to determine an exhaust gas temperature, and a processing circuit. The processing circuit is structured to determine whether the exhaust gas temperature is at or below a predefined threshold temperature; provide a first command to control the heater in response to the exhaust gas temperature being at or below the predefined threshold temperature; selectively provide a second command to increase the exhaust gas temperature; and coordinate the first and second commands, where the first command is provided followed by the second command only if the predefined threshold temperature is not attained by the first command.

20 Claims, 7 Drawing Sheets

(51) Int. Cl.

| | |
|---|---|
| ***F01N 3/10*** | (2006.01) |
| ***F02D 41/40*** | (2006.01) |
| ***F01N 3/027*** | (2006.01) |
| ***F01N 9/00*** | (2006.01) |

(52) U.S. Cl.

CPC ............ *F01N 3/2026* (2013.01); *F01N 9/005* (2013.01); *F01N 2240/04* (2013.01); *F01N 2240/16* (2013.01); *F01N 2550/22* (2013.01); *F01N 2900/04* (2013.01); *F01N 2900/0602* (2013.01); *F01N 2900/16* (2013.01); *F01N 2900/1602* (2013.01); *F01N 2900/1624* (2013.01); *F01N 2900/1626* (2013.01); *F02D 2200/06* (2013.01); *F02D 2200/50* (2013.01)

(56) References Cited

U.S. PATENT DOCUMENTS

| | | | | |
|---|---|---|---|---|
| 5,746,053 | A | 5/1998 | Hibino | |
| 5,904,902 | A * | 5/1999 | Matuoka | F01N 3/2013 422/174 |
| 6,032,461 | A | 3/2000 | Kinugasa et al. | |
| 6,325,053 | B1 | 12/2001 | Zappador et al. | |
| 6,477,831 | B1 | 11/2002 | Ballinger et al. | |
| 6,681,563 | B2 | 1/2004 | Glugla et al. | |
| 7,104,051 | B2 | 9/2006 | Shimasaki et al. | |
| 8,042,326 | B2 | 10/2011 | Farell et al. | |
| 8,051,644 | B2 | 11/2011 | Gonze et al. | |
| 8,117,832 | B2 | 2/2012 | Wagner et al. | |
| 8,347,607 | B2 | 1/2013 | Gonze et al. | |
| 8,475,574 | B2 | 7/2013 | Gonze et al. | |
| 8,505,282 | B2 | 8/2013 | Gonze et al. | |
| 8,701,388 | B2 * | 4/2014 | Gonze | F01N 3/035 60/284 |
| 8,883,102 | B1 | 11/2014 | Lambert et al. | |
| 9,038,376 | B2 | 5/2015 | Petrovic et al. | |
| 9,328,674 | B2 | 5/2016 | Geveci et al. | |
| 9,388,722 | B2 | 7/2016 | Gonze et al. | |
| 9,470,128 | B2 | 10/2016 | Silvers et al. | |
| 9,863,352 | B2 | 1/2018 | Stenlaas et al. | |
| 9,878,767 | B2 | 1/2018 | Dahlberg et al. | |
| 9,968,886 | B2 | 5/2018 | Balenovic et al. | |
| 10,273,846 | B2 | 4/2019 | Baensch et al. | |
| 10,371,029 | B2 | 8/2019 | Sakuma et al. | |
| 10,408,103 | B1 | 9/2019 | Miao et al. | |
| 10,494,971 | B2 | 12/2019 | Younkins et al. | |
| 2009/0000604 | A1 | 1/2009 | Bond et al. | |
| 2012/0102920 | A1 | 5/2012 | Pipis, Jr. | |
| 2012/0173062 | A1 | 7/2012 | Madurai Kumar et al. | |
| 2012/0255285 | A1 * | 10/2012 | Gonze | F01N 3/035 60/300 |
| 2012/0324868 | A1 * | 12/2012 | Kim | B60W 10/30 60/274 |
| 2013/0047607 | A1 | 2/2013 | Petrovic | |
| 2013/0213010 | A1 * | 8/2013 | Zhang | F01N 9/002 60/274 |
| 2014/0311134 | A1 * | 10/2014 | Yoshioka | F01N 9/00 60/286 |
| 2015/0315952 | A1 | 11/2015 | Hall | |
| 2016/0153417 | A1 | 6/2016 | Tochigi | |
| 2017/0130630 | A1 | 5/2017 | Younkins | |
| 2018/0094556 | A1 | 4/2018 | Kurtz et al. | |
| 2018/0142599 | A1 | 5/2018 | Pannuzzo et al. | |
| 2018/0202985 | A1 | 7/2018 | Wait | |
| 2018/0334939 | A1 | 11/2018 | Mital et al. | |
| 2018/0334970 | A1 | 11/2018 | Kamo | |
| 2019/0155230 | A1 * | 5/2019 | Culbertson | F01N 3/208 |
| 2019/0360415 | A1 | 11/2019 | Romanato | |
| 2020/0102874 | A1 | 4/2020 | Kurtz et al. | |
| 2020/0408163 | A1 | 12/2020 | Webb et al. | |
| 2021/0372310 | A1 * | 12/2021 | Bare | F01N 3/021 |

FOREIGN PATENT DOCUMENTS

| | | | |
|---|---|---|---|
| DE | 10 2012 007 053 | | 10/2013 |
| DE | 10 2015 200 023 | | 7/2015 |
| DE | 10 2018 207 627 | A1 | 11/2019 |
| GB | 2 478 541 | | 9/2011 |
| JP | 2014-118874 | A | 6/2014 |
| WO | WO-2006/012484 | | 2/2006 |
| WO | WO-2006/100051 | | 9/2006 |
| WO | WO-2008/109215 | | 9/2008 |
| WO | WO-2012/040613 | | 3/2012 |
| WO | WO-2014/055018 | | 4/2014 |
| WO | WO-2016/029207 | | 2/2016 |
| WO | WO-2020/074268 | | 4/2020 |
| WO | WO-2020/159991 | A1 | 8/2020 |
| WO | WO-2021/069162 | | 4/2021 |

* cited by examiner

SYSTEMS AND METHODS FOR COORDINATED EXHAUST TEMPERATURE CONTROL WITH ELECTRIC HEATER AND ENGINE

CROSS-REFERENCE TO RELATED APPLICATION

This application is a continuation of U.S. application Ser. No. 16/829,581, filed Mar. 25, 2020, which is incorporated herein by reference in its entirety.

TECHNICAL FIELD

The present disclosure relates to coordinating an electric heater and an engine using a temperature control lever.

BACKGROUND

Many engines are coupled to an exhaust aftertreatment system that reduces harmful exhaust gas emissions (e.g., nitrous oxides (NOx), sulfur oxides, particulate matter, etc.). For example, a reductant may be injected into the exhaust stream to chemically bind to particles in the exhaust gas. This mixture interacts with a Selective Catalytic Reduction (SCR) catalyst that, at a certain temperature, causes a reaction in the mixture that converts the harmful NOx particles into pure nitrogen and water. However, if the catalyst is not at the proper temperature, this conversion will not happen or will happen at a lower efficiency. Therefore, temperature control of the catalyst is pertinent for treating exhaust gases.

SUMMARY

One embodiment relates to a system including an aftertreatment system coupled to an engine, a heater disposed between the engine and the aftertreatment system, and at least one sensor configured to determine an exhaust gas temperature. The aftertreatment system includes a catalyst. The system includes a controller. The controller is structured to determine whether the exhaust gas temperature is at or below a predefined threshold temperature, provide a first command to start and control the heater in response to the exhaust gas temperature being at or below the predefined threshold temperature, modulate control of the heater as a function of the predefined threshold temperature and an actual temperature, and selectively provide a second command for a close post injection based on the exhaust gas temperature. The controller is further structured to coordinate the first and second commands using a chaining sequence, wherein the first command is provided followed by the second command only if the predefined threshold temperature is not attained by the first command.

Another embodiment relates to a system including a controller structured to determine whether the exhaust gas temperature is at or below a predefined threshold temperature, provide a first command to start and control a heater in response to the exhaust gas temperature being at or below the predefined threshold temperature, modulate control of the heater as a function of the predefined threshold temperature and an actual temperature, and provide a second command for far post injection based on the exhaust gas temperature. The controller is structured to coordinate the first and second commands using a chaining sequence, wherein the first command is provided followed by the second command only if the predefined threshold temperature is not attained by the first command.

Another embodiment relates to a method including receiving information indicative of an exhaust gas temperature, determining that the exhaust gas temperature is at or below a predefined threshold temperature, activating a heater based on the determination, modulating control of the heater as a function of the predefined threshold temperature and an actual temperature, and selectively and subsequently, commanding a post injection for an engine based on the determination.

This summary is illustrative only and is not intended to be in any way limiting. Other aspects, features, and advantages of the devices or processes described herein will become apparent in the detailed description set forth herein, taken in conjunction with the accompanying figures, wherein like reference numerals refer to like elements.

DETAILED DESCRIPTION

Figure 1:
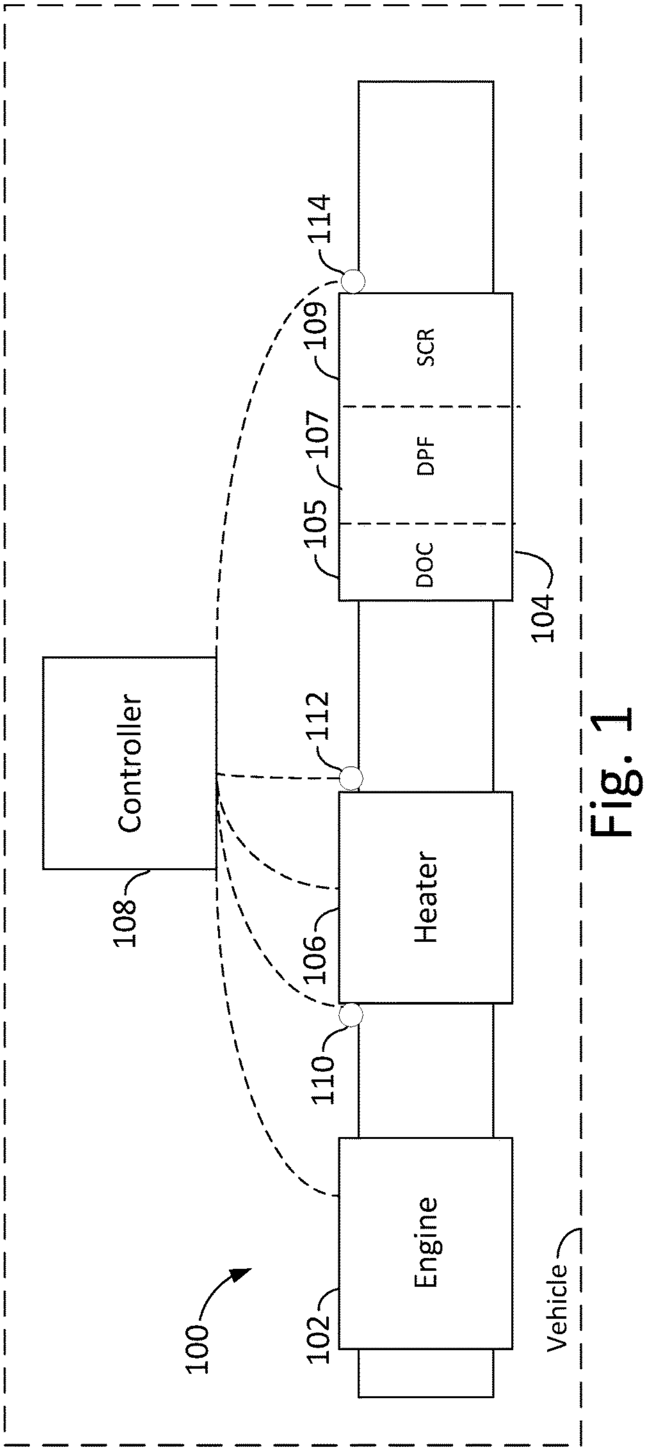
FIG. 1 is a schematic view of a block diagram of a system, according to an example embodiment.

Following below are more detailed descriptions of various concepts related to, and implementations of, methods, apparatuses, and systems to combine and coordinate exhaust temperature control with an electric heater of engines, and particularly diesel or compression ignition engines. Before turning to the figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

A key component in an Ultra-Low NOx capable engines is a Selective Catalytic Reduction (SCR) system that utilizes a two-step process to greatly reduce harmful NOx emissions present in exhaust gas. First, a doser injects a reductant into the exhaust stream. This reductant may be a urea, diesel exhaust fluid (DEF), Adblue®, a urea water solution (UWS), an aqueous urea solution (e.g., AUS32, etc.), or another similar fluid that chemically binds to particles in the exhaust gas. Then, this mixture interacts with an SCR catalyst that, when at a certain temperature, causes a reaction in the mixture that converts the harmful NOx particles into less harmful components (e.g., pure nitrogen and water). However, if the catalyst is not at the proper temperature, this conversion will not happen or will happen at a lower efficiency. Heating and controlling the temperature of the catalyst is however difficult.

Referring to the Figures generally, systems and methods for catalyst inlet and outlet temperature control of an exhaust aftertreatment system via coordination between an electric heater and fueling system controls are shown and described herein according to various embodiments. Combining the electrical heater and engine based temperature control levers (e.g., fueling system controls) are useful to control the catalyst temperature. This combination is particularly beneficial with cold-start applications. "Cold-start" refers to the engine sitting for a long period of time where the engine temperature is substantially equal to that of the outside or ambient outside temperature. Thus, in very cold situations (e.g., below the freezing temperature of water), the air passing through the system is also very cold which means increasing the temperature to help promote catalyst efficiency is important to the operational ability of the catalyst of the system. Accordingly, the present disclosure is useful in cold and extreme cold-start situations. The present disclosure is also applicable in "stay hot" situations (e.g., engine idle). For instance, a driver may idle their truck to relieve the load on the engine but maintain some power inside the cab. If the engine is not very hot (e.g., below a threshold temperature level for, e.g., desired NOx conversion), the temperature of the exhaust gas coming out will be low, so the catalyst will equilibrate to the temperature of the exhaust coming out of the engine (e.g., 150 degrees Celsius). Such a low temperature hinders the ability of the catalyst to operate sufficiently (e.g., convert NOx efficiently).

According to the present disclosure, a system, method, and apparatus is disclosed for augmenting and supplementing the heating of the catalyst of a SCR in order to promote desired catalytic activity of the catalyst (e.g., converting NOx to less harmful elements at the desired rate, which is known as the NOx conversion rate). A controller is provided that is coupled to a heater, the engine, and a variety of other components. The controller utilizes levers on the engine side to increase the exhaust gas temperature under particular circumstances (e.g., cold start situations). For instance, the controller may utilize close post injection based on a temperature set-point to raise exhaust gas temperature entering the catalyst. In certain fueling systems, there can be multiple strikes (i.e., injections). For instance, a small pilot injection may be commanded followed by a big main injection for combustion. These injections may occur in the power stroke, or sometimes even in the exhaust stroke. Any injection that happens after the main injection is a "post injection." Post injections are not used to produce power, but to produce exhaust energy. Post injections include a close post injection and a far post injection. Close post injections happen very close to the main injection in terms of crank angle or time (i.e., occurs closer to combustion and power stroke where the exhaust valve is not open) and that extra injection of fuel burns inside the cylinder to heat up the exhaust leaving the engine. Close post injection is one temperature control lever of exhaust gas of the present disclosure.

Additionally, there is another lever which is called the far post injection, much later in the combustion cycle (i.e., occurs closer to the exhaust stroke). Far post injection does not burn inside the cylinder, but instead, the fuel gets expunged along with its own gasses and it burns outside on a different catalyst (i.e., a diesel oxidation catalyst (DOC)). Far post injection occurs downstream and thus, is used to raise the temperature of downstream devices, such as the diesel particulate filter (DPF) for purposes of regeneration, for instance.

As such, a system and method to combine the operation of the electric heater and the engine-based temperature control levers is advantageous. A first embodiment includes a coordinated control of the DOC inlet temperature using an exhaust heater and in-cylinder close-post injection. The DOC inlet temperature is or may be representative of an engine-out temperature. A second embodiment includes a coordinated control of the DOC outlet temperature using the exhaust heater, the in-cylinder close post injection, the in-cylinder far post injection.

Referring now to FIG. 1, a system 100 is illustrated according to an exemplary embodiment. The system 100 includes an engine 102, an aftertreatment system 104, a heater 106, and a controller 108. In this exemplary embodiment, the system 100 is implemented with an on-road or an off-road vehicle including, but not limited to, line-haul trucks, mid-range trucks (e.g., pick-up truck, etc.), sedans, coupes, tanks, airplanes, boats, and any other type of vehicle. However, the system may also be implemented with stationary pieces of equipment like power generators or gen-sets.

In the example shown, the engine 102 is structured as a compression-ignition internal combustion engine that utilizes diesel fuel. However, in various alternate embodiments, the engine 102 may be structured as any other type of engine (e.g., spark-ignition) that utilizes any type of fuel (e.g., gasoline, natural gas). In still other example embodiments, the engine 102 may be or include an electric motor (e.g., a hybrid drivetrain). The engine 102 includes one or more cylinders and associated pistons. Air from the atmosphere is combined with fuel, and combusted, to power the engine 102. Combustion of the fuel and air in the compression chambers of the engine 102 produces exhaust gas that is operatively vented to an exhaust pipe and to the aftertreatment system 104.

In the example shown, system 100 includes the aftertreatment system 104. The aftertreatment system 104 is structured to treat exhaust gases from the engine 102, which enter the aftertreatment system 104 via an exhaust pipe, in order to reduce the emissions of harmful or potentially harmful elements (e.g., NOx emissions, particulate matter, etc.). The aftertreatment system 104 may include various components and systems, such as a diesel oxidation catalyst (DOC) 105, a diesel particulate filter (DPF) 107, and a selective catalytic reduction (SCR) system 109. The SCR 109 converts nitrogen oxides present in the exhaust gases produced by the engine 102 into diatomic nitrogen and water through oxidation within a catalyst. The DPF 107 is configured to remove particulate matter, such as soot, from exhaust gas flowing in the exhaust gas conduit system. In some implementations, the DPF 107 may be omitted. Also, the spatial order of the catalyst elements may be different.

The aftertreatment system 104 may further include a reductant delivery system which may include a decomposition chamber (e.g., decomposition reactor, reactor pipe, decomposition tube, reactor tube, etc.) to convert the reductant (e.g., urea, diesel exhaust fluid (DEF), Adblue®, a urea water solution (UWS), an aqueous urea solution, etc.) into ammonia. A diesel exhaust fluid (DEF) is added to the exhaust gas stream to aid in the catalytic reduction. The reductant may be injected by an injector upstream of the SCR catalyst member such that the SCR catalyst member receives a mixture of the reductant and exhaust gas. The reductant droplets undergo the processes of evaporation, thermolysis, and hydrolysis to form non-NOx emissions (e.g., gaseous ammonia, etc.) within the decomposition chamber, the SCR catalyst member, and/or the exhaust gas conduit system, which leaves the aftertreatment system 104. The aftertreatment system 104 may further include an oxidation catalyst (e.g., the DOC 105) fluidly coupled to the exhaust gas conduit system to oxidize hydrocarbons and carbon monoxide in the exhaust gas. In order to properly assist in this reduction, the DOC 105 may be required to be at a certain operating temperature. In some embodiments, this certain operating temperature is between 200 degrees C. and 500 degrees C. In other embodiments, the certain operating temperature is the temperature at which the conversion efficiency of the DOC 105 exceeds a predefined threshold (e.g., the conversion of NOx to less harmful compounds, which is known as the NOx conversion efficiency).

The heater 106 is a heating element structured to output heat in order to increase the temperature of the exhaust gas. The heater 106 may have any of various designs (e.g., a resistive coil heater like shown or another type of heater). The heater 106 may be a convective heater to heat the exhaust gas passing through it or to heat the catalyst substrate directly, for example. Accordingly, the heater 106 may be powered by a battery or alternator (or another electronic source, such as a capacitor) of the system 100. Heating the exhaust gas increases efficiency and the success of the DOC 105 in cold situations (e.g., ambient temperatures at or below the freezing temperature of water). The heater 106 is controlled by the controller 108 to turn the heater 106 on or off as further described below. When the heater 106 is "on" or "activated," the heater 106 outputs heat, and when the heater 106 is "off" or "deactivated," the heater 106 ceases heat output.

As shown in the embodiment FIG. 1, the heater 106 is positioned downstream from the engine 102 and upstream of the DOC 105 (i.e., between the engine 102 and the DOC 105) in order to heat the air leaving the engine 102 and entering the DOC 105. The heater 106 is coupled to the exhaust pipe that leads from the engine 102 to the aftertreatment system 104.

As shown, the system 100 includes a variety of sensors in a variety of locations. It should be understood that this arrangement of sensors is exemplary only, such that other systems may include more or less sensors, the relative positioning may be changed, and the sensor type (real or virtual) may also be changed. Multiple sensors with different functions may be coupled to the system 100. In the example of FIG. 1, the system 100 includes an inlet heater temperature sensor 110, an outlet heater temperature sensor 112, and an SCR-out temperature sensor 114. The inlet heater temperature sensor 110 is structured to acquire data or information regarding the temperature of the exhaust gas as it leaves the engine 102 and enters the heater 106. The outlet heater temperature sensor 112 is structured to acquire data or information regarding the temperature of the exhaust gas as it leaves the heater 106 and enters the DOC 105. These sensors may be included with the DOC 105, or separate components coupled to the piping into and out of the DOC. The SCR-out temperature sensor 114 is structured to acquire data or information regarding the temperature of the exhaust gas as it leaves the SCR 109 and aftertreatment system 104.

In operation, the sensors are coupled to and provide data/information to the controller 108 for monitoring operation of the certain components and to control certain components (e.g., turn on the heater 106). In other embodiments, one or more of the sensors may be virtual such that the controller 108 performs one or more operations to estimate the pertinent temperatures at the desired locations.

The controller 108 is coupled to the components of system 100 and the sensors to receive signals indicative of operation of components of the system 100 and to issue commands to at least partly control various the components of the system 100 based on an analysis of those signals. In particular, the controller 108 is structured to control the system 100 in order to obtain and maintain a target temperature (i.e., the predefined threshold temperature) of the exhaust gas existing the heater.

Figure 2:
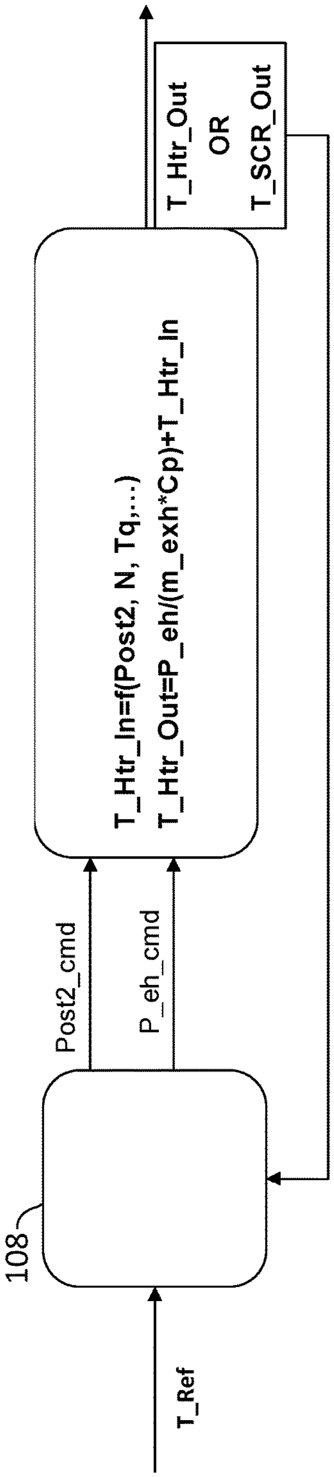
FIG. 2 is a schematic view of a block diagram of controller logic for the controller of FIG. 1, according to an example embodiment.

Referring now to FIG. 2, block diagram logic for the controller 108 is shown to operate or function using/on a multivariable model. The multivariable model incorporates multiple variables in order to determine and output various commands. For instance, as explained herein, the multivariable model may be based on several temperatures, quality and quantity parameters, expended power, and the commands. Additionally, the multivariable model incorporates the predefined threshold temperature (T_Ref) and a predicted temperature output. The predicted temperature output is an estimated temperature or projection of the exhaust gas temperature. For instance, the controller 108 may predict an output temperature of the exhaust gas that is leaving the heater 106 based on the heater power and temperature of the exhaust gas entering the heater 106. The controller 108 determines and outputs a command based on certain inputs from the sensors and how it compares to the temperature reference (T_Ref, which is also referred to as the predefined threshold temperature or the desired temperature of the exhaust gas). For instance the controller 108 may receive a reading regarding an inlet temperature of the exhaust gas entering the heater 106 (T_Htr_In), an output temperature of the exhaust gas leaving the heater 106 (T_Htr_Out), and/or the temperature of the exhaust gas leaving the SCR 109 (T_SCR_Out). Whether those temperatures are at or below a predefined threshold temperature is analyzed by the controller 108 which then commands various actions dependent on that determination, such as the close post injection command (Post2_cmd) or the heater power command (P_eh_cmd). The inlet temperature of the heater 106 (T_Htr_In) is a function of the close post quantity command (Post2_cmd) and additional post timing, quality, etc. parameters. The temperature of the gas exiting the heater 106 (T_Htr_Out), is a function of the heater inlet temperature (T_Htr_In) plus a function of the power expended to the heater 106 (P_eh/(m_exh*Cp)). In this embodiment, the output weighted most heavily is the exhaust temperature leaving the heater 106 (T_Htr_Out) because that is likely the temperature entering the catalyst (e.g., the DOC 105) (T_DOC_In).

The system thus has the ability to command a certain amount of close post injection quality, quantity, and timing, and heater power. One way to achieve the coordination between the commands is to make the temperature reference (i.e., T_Ref, the predefined threshold temperature), the same threshold/value for both commands. The predefined threshold value may be between 200 degrees C. and 500 degrees C. degrees. Additionally, the controller 108 may be programmed using a chaining sequence as described herein. For example, the controller 108 may try to attain the required temperature for T_Htr_Out using only the close post quantity command first and use the heater 106 if the target temperature is not met.

The system 100 may also include an operator input/output (I/O) device (not shown). The operator I/O device is coupled to the controller 108, such that information may be exchanged between the controller 108 and the operator I/O device, wherein the information may relate to one or more components of FIG. 1 or determinations of the controller 108. The operator I/O device enables an operator to communicate with the controller 108 and one or more components of the system 100. For example, the operator I/O device may include, but is not limited to, an interactive display, a touchscreen device, one or more buttons and switches, voice command receivers, etc. In various alternate embodiments, the controller 108 and components described herein may be implemented with non-vehicular applications as described above (e.g., a power generator). Accordingly, the operator I/O device may be specific to those applications. For example, in those instances, the operator I/O device may include a laptop computer, a tablet computer, a desktop computer, a phone, a watch, a personal digital assistant, etc. Via the operator I/O device, the controller 108 may provide diagnostic information, a fault or service notification based on one or more determinations. For example, in some embodiments, the controller 108 may display, via the operator I/O device, a temperature of the DOC 105, a temperature of the engine 102 and the exhaust gas, and various other information.

Figure 3:
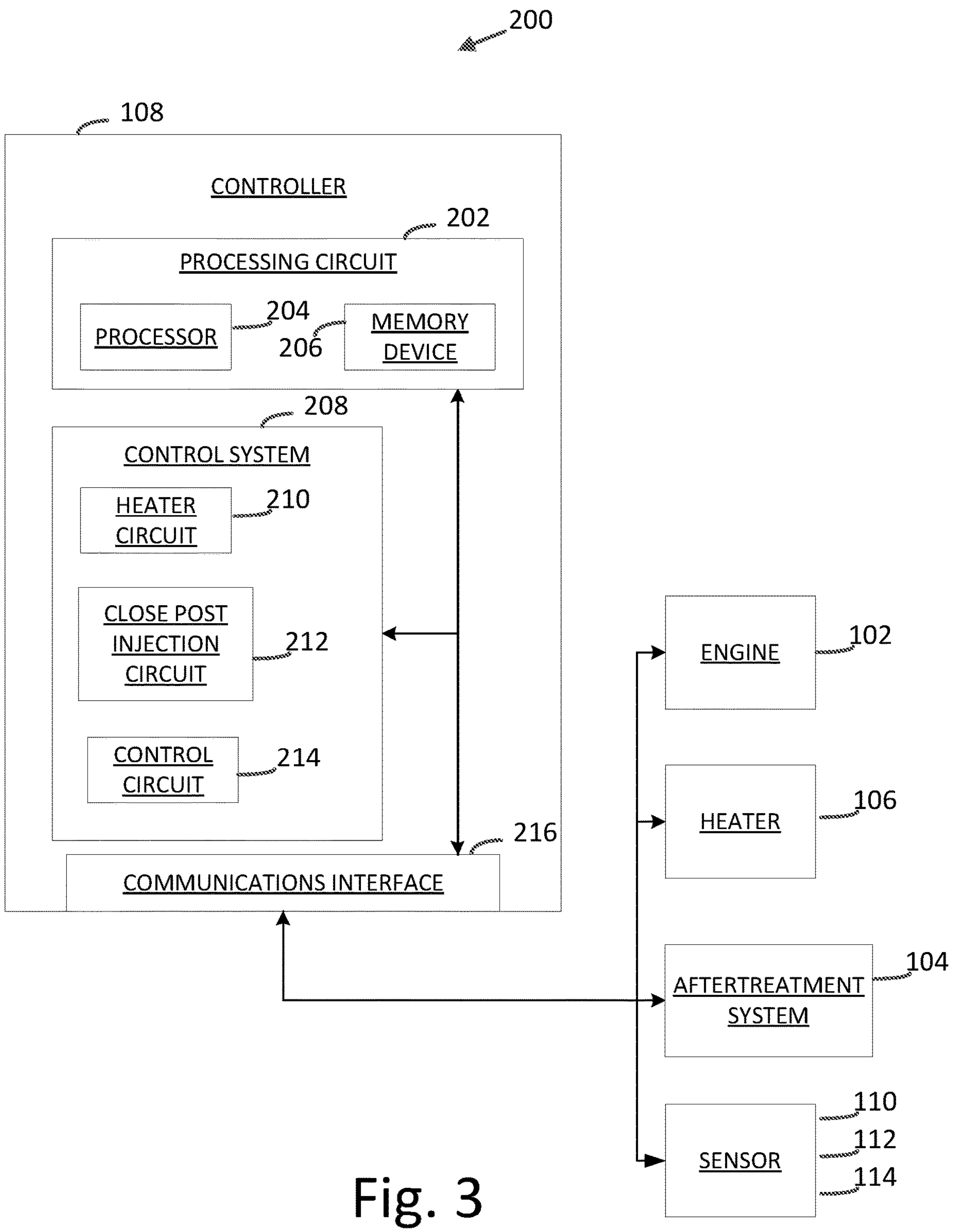
FIG. 3 is a block diagram of the controller of FIGS. 1-2, according to an example embodiment.

Referring now to FIG. 3, a schematic diagram 200 of the controller 108 of the system 100 of FIG. 1 is shown according to an example embodiment. The controller 108 may be structured as one or more electronic control units (ECU). The controller 108 may be separate from or included with at least one of a transmission control unit, an exhaust aftertreatment control unit, a powertrain control module, an engine control module, etc. In one embodiment, the components of the controller 108 are combined into a single unit. In another embodiment, one or more of the components may be geographically dispersed throughout the system. All such variations are intended to fall within the scope of the disclosure. The controller 108 is shown to include a processing circuit 202 having a processor 204 and a memory device 206, a control system 208 having a heater circuit 210, a close post injection circuit 212, and a control circuit 214, and a communications interface 216.

In one configuration, the heater circuit 210, the close post injection circuit 212, and the control circuit 214 are embodied as machine or computer-readable media that is executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the heater circuit 210, the close post injection circuit 212, and the control circuit 214 are embodied as hardware units, such as electronic control units. As such, the heater circuit 210, the close post injection circuit 212, and the control circuit 214 may be embodied as one or more circuitry components including, but not limited to, processing circuitry, network interfaces, peripheral devices, input devices, output devices, sensors, etc. In some embodiments the heater circuit 210, the close post injection circuit 212, and the control circuit 214 may take the form of one or more analog circuits, electronic circuits (e.g., integrated circuits (IC), discrete circuits, system on a chip (SOC_s) circuits, microcontrollers, etc.), telecommunication circuits, hybrid circuits, and any other type of "circuit." In this regard, the heater circuit 210, the close post injection circuit 212, and the control circuit 214 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The heater circuit 210, the close post injection circuit 212, and the control circuit 214 may also include programmable hardware devices such as field programmable gate arrays, programmable array logic, programmable logic devices or the like. The heater circuit 210, the close post injection circuit 212, and the control circuit 214 may include one or more memory devices for storing instructions that are executable by the processor(s) of the heater circuit 210, the close post injection circuit 212, and the control circuit 214. The one or more memory devices and processor(s) may have the same definition as provided below with respect to the memory device 206 and processor 204. In some hardware unit configurations and as described above, the heater circuit 210, the close post injection circuit 212, and the control circuit 214 may be geographically dispersed throughout separate locations in the system. Alternatively and as shown, the heater circuit 210, the close post injection circuit 212, and the control circuit 214 may be embodied in or within a single unit/housing, which is shown as the controller 108.

In the example shown, the controller 108 includes the processing circuit 202 having the processor 204 and the memory device 206. The processing circuit 202 may be structured or configured to execute or implement the instructions, commands, and/or control processes described herein with respect to the heater circuit 210, the close post injection circuit 212, and the control circuit 214. The depicted configuration represents the heater circuit 210, the close post injection circuit 212, and the control circuit 214 as machine or computer-readable media. However, as mentioned above, this illustration is not meant to be limiting as the present disclosure contemplates other embodiments where the heater circuit 210, the close post injection circuit 212, and the control circuit 214, or at least one circuit of the circuits the heater circuit 210, the close post injection circuit 212, and the control circuit 214, is configured as a hardware unit. All such combinations and variations are intended to fall within the scope of the present disclosure.

The processor 204 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the heater circuit 210, the close post injection circuit 212, and the control circuit 214 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle; in the example shown, the system 100 is included in a vehicle) and out-of-vehicle communications (e.g., with a remote server). For example and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication).

The communications interface 216 may facilitate communication between and among the controller 108 and one or more components of the system 100 (e.g., the engine 102, the transmission, the aftertreatment system 104, the temperature sensors 110, 112, 114 etc.). Communication between and among the controller 108 and the components of the system 100 may be via any number of wired or wireless connections (e.g., any standard under IEEE). For example, a wired connection may include a serial cable, a fiber optic cable, a CATS cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The heater circuit 210 is structured to communicate with and control, at least partly, the heater 106. The heater circuit 210 may turn on/off the heater 106. Depending on the capabilities of the heater 106, the heater circuit 210 may command the heater 106 to different temperature levels which may be based on a variety of conditions (e.g., when the outside temperature is at a water freezing temperature, the commanded heat temperature is X and when the outside temperature is more than a predefined amount below the water freezing temperature, the heat temperature is X+10 degrees Celsius). Thus, nuanced control of the heater 106 via the heater circuit 210 may be performed. The heater circuit 210 is coupled to temperature sensors 110, 112, 114. As described herein, in one embodiment, the command to activate the heater 106 (i.e., turn on) is based on the heater circuit 210 detecting an input regarding the temperature of the exhaust gas leaving the heater 106 (T_Htr_Out) at temperature sensor 112, and whether T_Htr_Out is at or below the predefined threshold. In various embodiments, the command to activate the heater 106 (i.e., turn on) is based on the heater circuit 210 detecting an input regarding the input temperature of the exhaust gas entering the heater 106 (T_Htr_In) at temperature sensor 110 and whether T_Htr_In is at or below the predefined threshold. In various embodiments, the command to activate the heater 106 (i.e., turn on) is based on the heater circuit 210 detecting an input regarding the temperature of the exhaust gas leaving the SCR 109 (T_SCR_Out) at temperature sensor 114, and whether T_SCR_Out is at or below the predefined threshold.

The heater circuit 210 may also determine if the heater 106 is required at all. For instance, if the engine 102 is not running and has not been running for a period of time, the engine 102 may be the same temperature at the ambient temperature. If the ambient temperature, and thus the engine 102, is not at or below a threshold temperature (e.g., water freezing temperature, or any temperature that prevents or hinders the engine from starting), the heater 106 may not be activated (turned off). Thus, a temperature, such as an ambient temperature, may be used to determine whether or not to activate the heater 106. In this regard and in response to an input to start the engine and a valid temperature reading from temperature sensors 110, 112, 114 (i.e., below a threshold value), the heater circuit 210 commands the heater 106 to turn on. Accordingly, exhaust gas is then heated by the heater 106. The heater circuit 210 is further structured to communicate with the heater 106 to cease heating upon command. For instance, such a command may come via a sensor at the outlet of the aftertreatment system 104 detecting NOx compliance and thus indicating that the catalyst no longer needs to be heated since the threshold exhaust gas temperature was achieved. As such, the heater circuit 210 commands the heater 106 to turn off. As still another example, the heater 106 may turn off after a predefined duration of being turned on. As still another example, a temperature of the exhaust gas may be used to turn off the heater. For example, if the exhaust gas temperature is at or above a predefined value, the heater 106 may be commanded to turn off.

The close post injection circuit 212 is structured to communicate with and control, at least partly, the engine 102 and, in particular, the fuel injector(s) coupled to the engine 102. For instance, a command is sent to the designated fuel injectors for in-cylinder close post injection (e.g., quantity and timing) when the close post injection circuit 212 provides that command or instruction to do so. Depending on the capabilities of the engine 102, the close post injection circuit 212 may command multiple close post injections at various times. Additionally, the close post injection circuit 212 may determine close post injection of the engine 102 is not required based on a variety of conditions (e.g., when the outside temperature is more than a predefined amount above the water freezing temperature). Thus, nuanced control of the engine 102 via the close post injection circuit 212 may be performed. The close post injection circuit 212 is coupled to temperature sensors 110, 112, 114. As described herein, in one embodiment, the command to selectively inject close post injections is based on the close post injection circuit 212 detecting an input regarding the temperature of the exhaust gas leaving the heater 106 (T_Htr_Out) and whether T_Htr_Out is at or below the predefined threshold. The close post injection circuit 212 may also receive and make the determination based on T_Htr_In, and T_SCR_Out, for instance.

The control circuit 214 is configured to communicate with and control the various components of the system 100 in response to the heater circuit 210 and the close post injection circuit 212. Thus, a single controller may coordinate the heater power command and the post injection command. The control circuit 214 is configured to communicate with the heater circuit 210 to modulate the heater power command as a function of the predefined threshold temperature and an actual temperature. The heater command is the control parameter for the heater, which defines how hot the heater should be modulated to, a ramp rate of controlling the heater output to a target heater output temperature, turning on the heater, turning off the heater, etc. The actual temperature is the temperature to which the exhaust gas has actually been heated. The control circuit 214 may increase or decrease the power to the heater 106, or turn on or off the heater 106, depending on whether the target temperature is attained and the difference between the target temperature and the actual temperature. For instance, the control circuit 214 may increase the heating power when the actual temperature of the exhaust gas is below the target temperature (i.e., the predefined threshold temperature) in order to reach the target temperature. The degree to which the heating power is increased to may depend on the extremity of the difference between the actual temperature and the target temperature. Additionally, the control circuit 214 may turn the heater 106 off when the actual temperature reaches or is above the target temperature because heating the exhaust gas is no longer needed. The control circuit 215 may alternatively decrease the heater power after the actual temperature of the exhaust gas reaches or is above the target temperature in order to maintain the temperature. Also for example, the control circuit 214 may turn the heater 106 back on again if the actual temperature begins to drop too close to or below the target temperature.

A chaining sequence is used in order to allow the control circuit 214 to determine the order of operations between commanding the heater circuit 210 and the close post injection circuit 212. The chaining sequence, or chaining rule, provides one commands until it saturates and then provides the second command if the set-point is not attained. By allowing one operation at a time, the control circuit 214 reduces any conflict, inefficiencies, and potential error from redundant efforts. For instance, when in operation, the control circuit 214 first communicates with the heater circuit 210 and commands the heater circuit 210 to operate normally. Simultaneously, the control circuit 214 commands the close post injection circuit 212 to pause its operations. The heater circuit 210 then communicates whether meeting the predefined threshold temperature has been achieved. Then once the capabilities of the heater 106 have been exhausted, the control circuit 214 communicates with the close post injection circuit 212 to move forward with normal functions, if necessary. Alternatively, the control circuit 214 may correspond with the close post injection circuit 212 first and the heater circuit 210 subsequently, depending on the data returned by the close post injection circuit 212. This may save computing power and increase operation of the controller.

These chaining sequence order and commands include, but are not limited to, instructions to alter the chaining sequence based on battery state, fuel level, and whether the actual gas temperature is above or below the predefined threshold. For instance, if the system 100 includes a battery (e.g., to power the electric heater) the control circuit 214 determines whether there is enough charge in the battery to use the heater and for how long. The control circuit 214 evaluates the sufficiency of state of charge (SOC) based on whether the SOC is at or below a predetermined threshold charge value. If the SOC is above the predetermined threshold charge value (e.g., 50% or more), the control circuit 214 may decide to run the heater circuit 210 first. Additionally, the control circuit 214 may analyze the fuel level based on a predetermined threshold fuel level to determine whether it at or below the predetermined threshold fuel level (e.g., 50%) and thus the fuel should be preserved, or whether there is enough fuel to burn in a post injection. Further, the control circuit 215 can evaluate the fuel level and the SOC simultaneously. For instance, when the fuel level is at 30% and the SOC is at 40%, the control circuit 214 determines both the fuel level and the SOC are below their respective threshold values and commands the heater 106 to activate because the SOC is higher than the fuel level. Lastly, the control circuit 214 determines whether the actual exhaust gas temperature is above or below the predefined threshold. If the exhaust gas temperature is above, for instance, the control circuit 214 may opt to forego either the heater circuit 210 or close post injection circuit 212 because additional heating for the catalyst is determined to be unnecessary.

Figure 4:
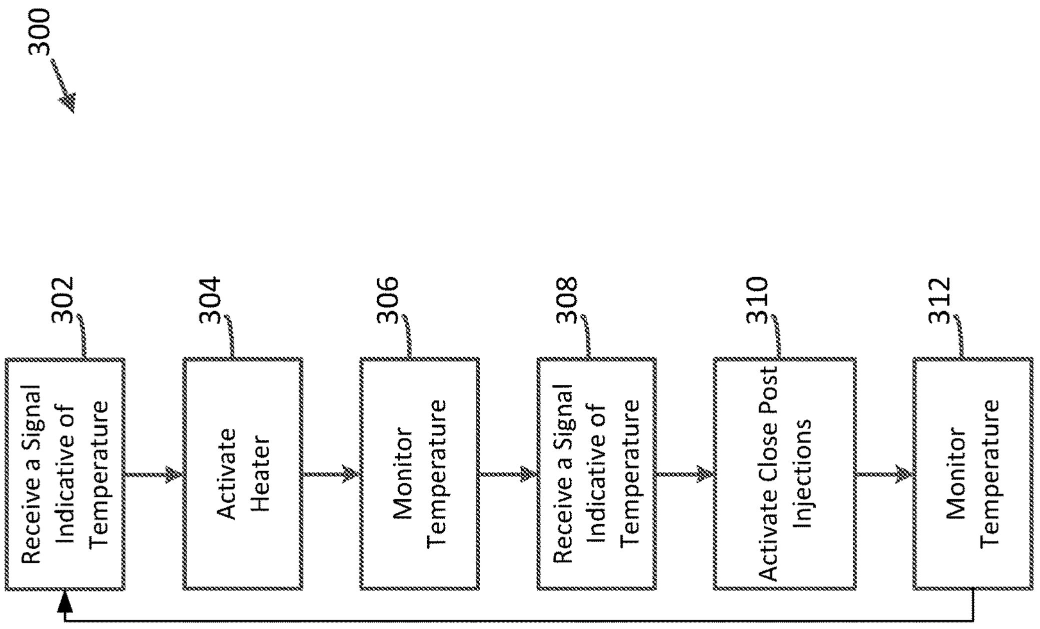
FIG. 4 is a flow diagram of a method of controlling a catalyst temperature of the system of FIG. 1, according to an example embodiment.

Referring now to FIG. 4, a method 300 for controlling a catalyst temperature with coordinated control of the heater outlet temperature (i.e., DOC inlet temperature) using the engine 102 (in-cylinder close post injection) and the heater 106 is shown, according to an exemplary embodiment. Method 300 may control DOC inlet temperature. The method may be performed by the components of FIGS. 1-3, such that reference may be made to them to aid explanation of the method 300. It should be noted that due the chaining sequence as described herein, the method 300 is exemplary and the order of operations may vary in other embodiments.

At step 302, a command to activate the heater 106 is received. This command may come from the controller 108 based on the inlet heater temperature sensor 110, the outlet heater temperature sensor 112, and/or the SCR-out temperature sensor 114. The controller 108 determines via the temperature reading received from the temperature sensors whether the exhaust gas temperature is at or below a threshold temperature level. For example, the predefined threshold temperature may be between 200 degrees C. and 500 degrees C. If the temperature is below the threshold level such as a water freezing temperature, this may indicate inadequate catalyst heating. As such and based on this determination, the heater circuit 210 commands and the heater 106 to start at step 304. At step 306, the temperature sensors 110, 112, and 114 may monitor the exhaust gas temperature. At this step, the heater circuit 210 may modulate the command to increase or decrease the heater power, or turn off the heater 106, depending on the target temperature and the actual temperature. At step 308, the temperature signal is received by the controller 108 to determine next steps. If the controller 108 determines the exhaust gas temperature is at or below a predefined threshold value, the close post injection circuit 212 commands the engine 102

(particularly, the designated fuel injectors of the fueling system) for close post injections at step 310. Further, the controller 108 may control the heater 106 to cease heating concurrently or nearly concurrently with the close post injections. Fuel may then be injected to heat the exhaust gas. At step 312, the inlet heater temperature sensor 110, the outlet heater temperature sensor 112, and/or the SCR-out temperature sensor 114 monitor the temperature again to determine whether the exhaust gas is at or below the predefined threshold value. If the exhaust gas is below the threshold value, the method 300 may be repeated. If the exhaust gas is at or above the predefined threshold value, proper catalyst heating is indicated.

Figure 5:
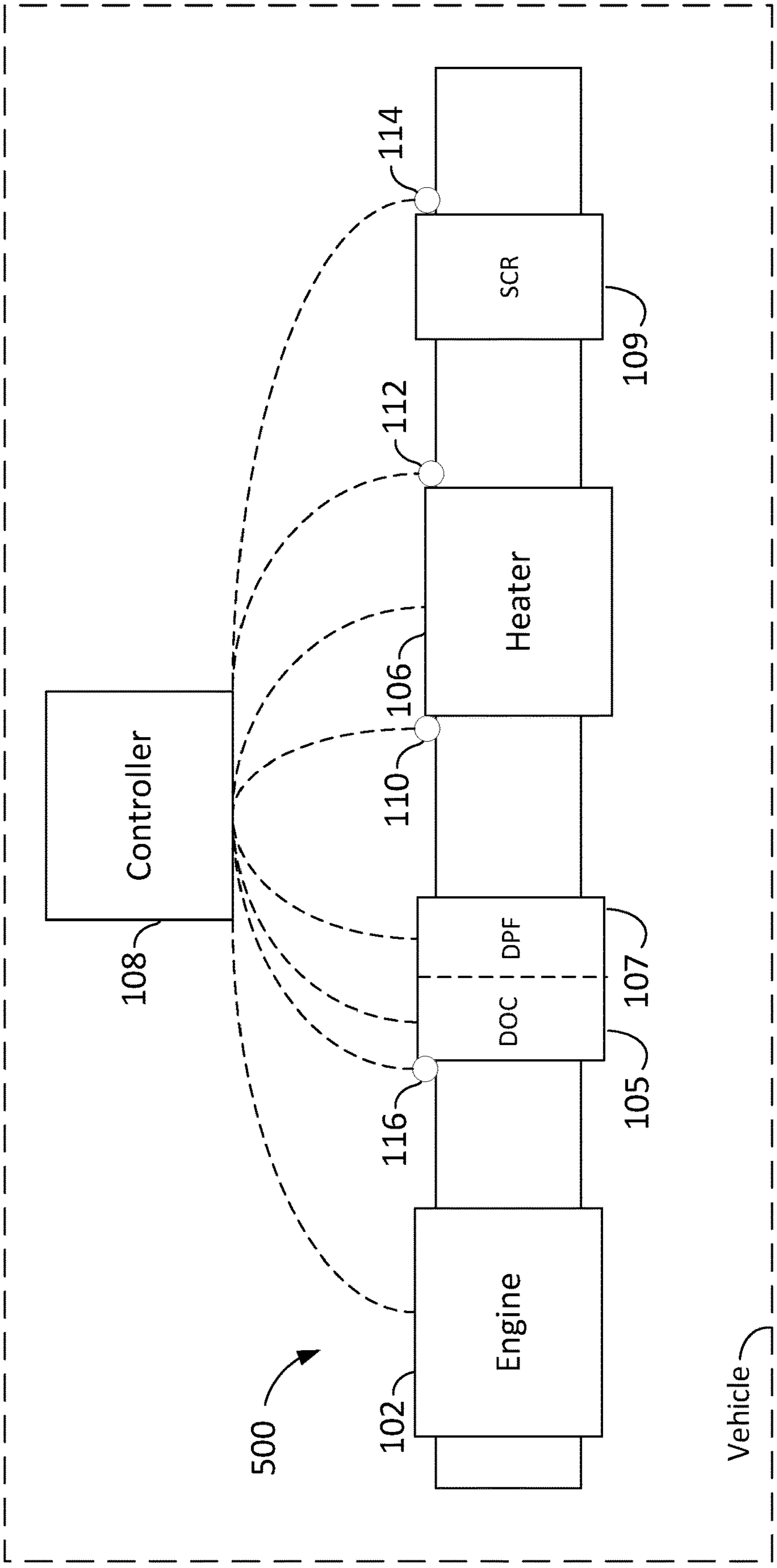
FIG. 5 is a schematic view of a block diagram of a system, according to an example embodiment.

Referring now to FIG. 5, a system 500 is illustrated according to an exemplary embodiment. Similarly to the system 100 described herein, the system 500 includes an engine 102, an aftertreatment system 104, a heater 106, a controller 108, an inlet heater temperature sensor 110, an outlet heater temperature sensor 112, and a SCR-out temperature sensor 114. Additionally, as with the system 100, the system 500 may also include an operator input/output (I/O) device (not shown). It should be understood that these elements encompass the definitions and examples as described in FIGS. 1-4. However, as shown, the heater 106 is positioned downstream from the engine 102 and the DOC 105 (e.g. upstream of DPF 107, downstream of DPF 107, upstream of SCR 109) in order to heat the air leaving entering the SCR 109. In various embodiments, the heater 106 may be positioned upstream from the DOC 105. The system 500 also includes a DOC-in temperature sensor 116.

Figure 6:
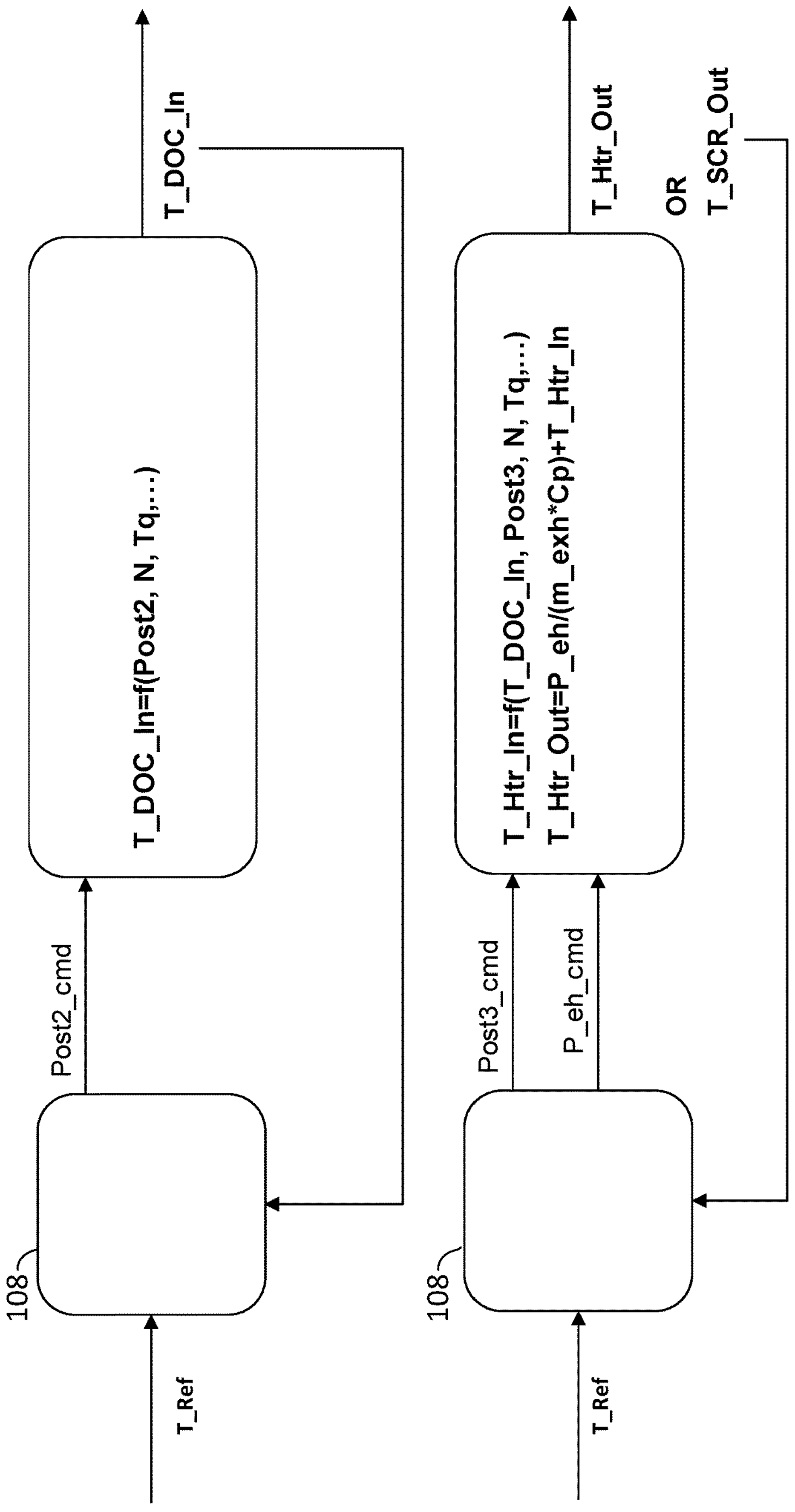
FIG. 6 is a schematic view of a block diagram of controller logic of the controller of FIG. 5, according to an example embodiment.

FIG. 6 shows another example logic for the controller 108. The coordination between the commands may incorporate the same temperature reference (T_Ref). While T_Ref is shown in multiple places, the value of T_Ref for each of those inputs may, in some embodiments, be different values. In other embodiments, T_Ref for each of these inputs may be the same value. In this example, the controller 108 outputs a command based on certain inputs read by the sensors. For instance the controller 108 may receive a reading regarding an inlet temperature of the exhaust gas entering the DOC 105 (T_DOC_In), an inlet temperature of the exhaust gas entering the heater 106 (T_Htr_In), an output temperature of the exhaust gas leaving the heater 106 (T_Htr_Out), or the temperature of the exhaust gas leaving the SCR 109 (T_SCR_Out). Whether those temperatures are at or below a predefined threshold temperature is analyzed by the controller 108 which then commands various actions dependent on that determination, such as the close post injection command (Post2_cmd), the heater power command (P_eh_cmd), or the far post injection command (Post3_cmd). As shown in FIG. 6, the controller 108 may be two controllers; one controller to run the close post injection command, and a second controller to run both the far post injection command and the heater power command. As explained herein, if two controllers are use, the controllers are configured to communicate with one another. Due to the physical configuration of the system 500 as shown in FIG. 5, the system 500 is conducive to splitting the functions into two controllers. However, in the example shown, one controller may be used to run all three commands.

In the embodiment here including the far post injection command, the inlet temperature of the heater 106 (T_Htr_In) is a function of the far post command (Post3_cmd), the temperature of the exhaust gas entering the DOC 105 (T_DOC_In) and additional post quantity, timing, etc. parameters. The outlet temperature of the heater 106 (T_Htr_Out), the temperature of the gas exiting the heater, is a function of the power expended to the heater 106 (P_eh/(m_exh*Cp)) plus a function of the heater inlet temperature (T_Htr_In). The inlet temperature of the exhaust gas entering the DOC 105 (T_DOC_In) is a function of the close post injection command (Post2_cmd) and additional post quantity, timing, etc. parameters. The first output of most interest is the exhaust gas temperature entering the heater 106 (T_Htr_In) because that is the temperature or approximate of the gas exiting the catalyst (e.g., the DOC 105. The second output of most interest is the exhaust gas temperature leaving the heater 106 (T_Htr_Out) because that is the temperature or approximate temperature entering another catalyst (e.g., the SCR).

The system thus has the ability to command a certain amount of far post injection quality, quantity, and timing, close post injection quality, quantity, and timing to a certain extent, and heater power. One way to achieve the coordination between the commands is to make the temperature reference, the predefined threshold temperature, the same threshold for all three commands. The predefined threshold value may be between 200 degrees C. and 500 degrees C. Additionally, the controller 108 may be programmed using a chaining sequence as described herein. For instance, the controller 108 may check T_Htr_Out first and determine a command, or lack thereof, before checking T_Htr_In or T_DOC_In, etc.

Figure 7:
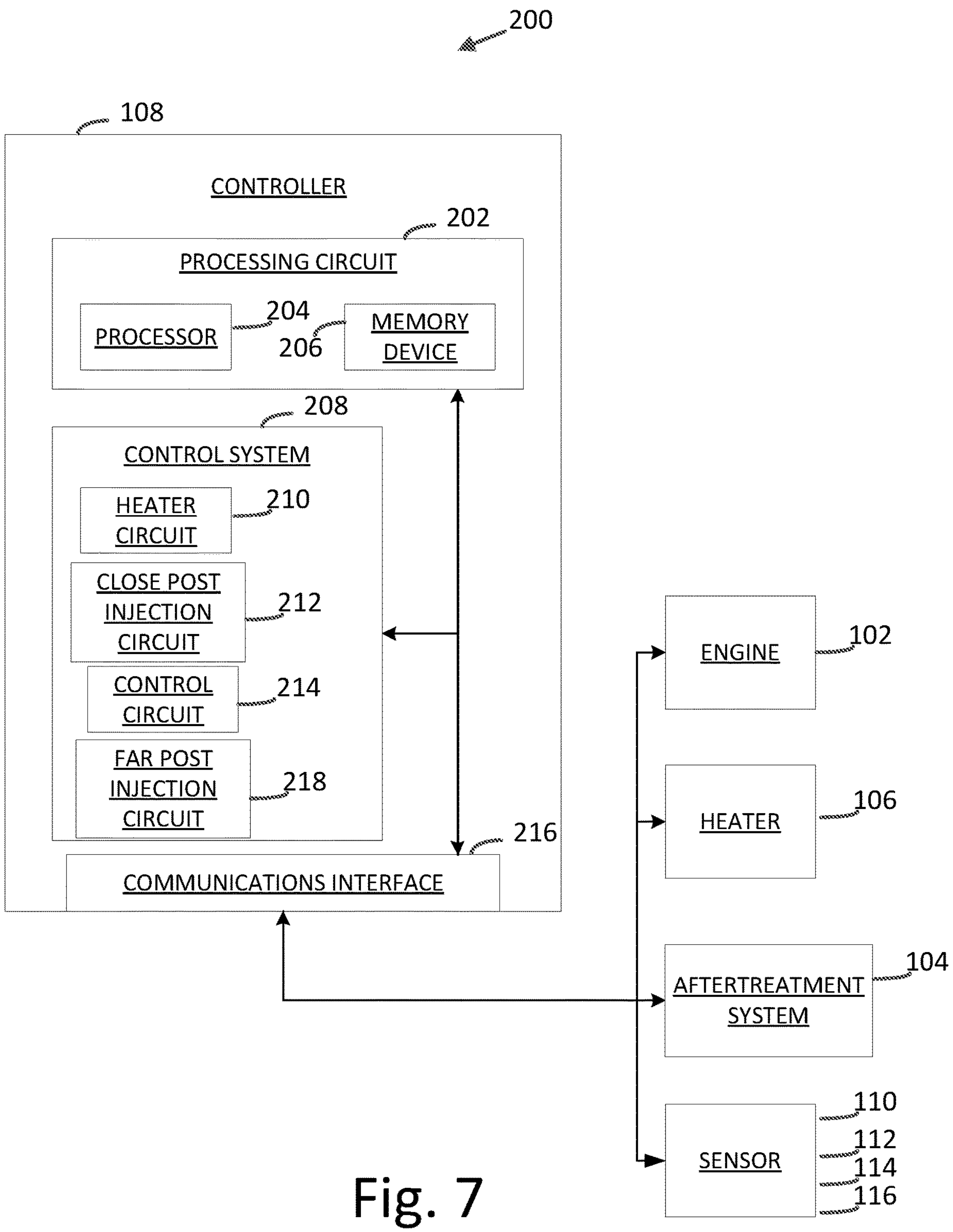
FIG. 7 is a block diagram of the controller of FIGS. 5-6, according to an example embodiment.

Referring now to FIG. 7, a schematic diagram 200 of the controller 108 of the system 100 of FIG. 1 is shown according to an exemplary embodiment. In one embodiment, the components of the controller 108 are combined into a single unit. In another embodiment, one or more of the components may be geographically dispersed throughout the system. All such variations are intended to fall within the scope of the disclosure. The controller 108 is shown to include a processing circuit 202 having a processor 204 and a memory device 206, a control system 208 having a heater circuit 210, a close post injection circuit 212, a control circuit 214, a far post injection circuit 218, and a communications interface 216. The far post injection circuit 218 is to be treated as encompassing the definitions and examples as the heater circuit 210, the close post injection circuit 212, and the control circuit 214 described herein with regard to the structure, communication, relationship, etc. within the controller 108 and the various connected components. In various other embodiments, there may be two controllers; one controller including the heater circuit 210 and the far post injection circuit 218, and a second controller including the close post injection circuit 212. The first and second controllers are operatively coupled to enable communication and operation of all included circuits.

The heater circuit 210 is structured to communicate with and control, at least partly, the heater 106, similarly as described in FIG. 3. The heater circuit 210 is coupled to temperature sensors 110, 112, 114, 116. As described herein, in one embodiment, the command to activate the heater 106 (i.e., turn on) is based on the heater circuit 210 detecting an input regarding the temperature of the exhaust gas leaving the heater 106 (T_Htr_Out) at temperature sensor 112, and whether T_Htr_Out is at or below the predefined threshold. In various embodiments, the command to activate the heater 106 (i.e., turn on) is based on the heater circuit 210 detecting an input regarding the input temperature of the exhaust gas entering the heater 106 (T_Htr_In) at temperature sensor 110, and whether T_Htr_In is at or below the predefined threshold. In various embodiments, the command to activate the heater 106 (i.e., turn on) is based on the heater circuit 210 detecting an input regarding the temperature of the exhaust gas leaving the SCR 109 (T_SCR_Out) at temperature sensor 114, and whether T_SCR_Out is at or below the predefined threshold. In various embodiments, the command to activate the heater 106 (i.e., turn on) is based on the heater circuit 210 detecting an input regarding the input temperature of the exhaust gas entering the DOC 105 (T_DOC_In) at temperature sensor 116, and whether T_SCR_Out is at or below the predefined threshold.

The close post injection circuit 212 is structured to communicate with and control, at least partly, the engine 102, as described in FIG. 3. For instance, a command is sent to the designated fuel injectors for in-cylinder close post injection (e.g., quantity and timing) when the close post injection circuit 212 provides that command or instruction to do so. The close post injection circuit 212 is coupled to temperature sensors 110, 112, 114, 116. As described herein, in one embodiment, the command to selectively inject close post injections is based on the close post injection circuit 212 detecting an input regarding the output temperature of the exhaust gas leaving the heater 106 (T_Htr_Out) and whether T_Htr_Out is at or below the predefined threshold. The close post injection circuit 212 may also receive and make the determination based on T_Htr_In, and T_SCR_Out, for instance.

The far post injection circuit 218 is structured to communicate with and control, at least partly, the engine 102. For instance, a command is sent to the designated fuel injectors for far post injection (e.g., quantity, quality, and timing) when the far post injection circuit 218 provides that command or instruction to do so. Depending on the capabilities of the engine 102, the far post injection circuit 218 may command multiple far post injections at various times. Additionally, the far post injection circuit 218 may determine far post injection of the engine 102 is not required based on a variety of conditions (e.g., when the outside temperature is more than a predefined amount above the water freezing temperature). Thus, nuanced control of the engine 102 via the far post injection circuit 218 may be performed. The far post injection circuit 218 is coupled to temperature sensors 110, 112, 114, 116. As described herein, in one embodiment, the command to selectively inject far post injections is based on the far post injection circuit 218 detecting an input regarding the output temperature of the exhaust gas leaving the heater 106 (T_Htr_Out) and whether T_Htr_Out is at or below the predefined threshold. The far post injection circuit 218 may also receive and make the determination based on T_DOC_In, T_Htr_In, and T_SCR_Out, for instance.

The control circuit 214 is configured to communicate with and control the various components of the system 100 in response to the heater circuit 210, the close post injection circuit 212, and the far post injection circuit 218. Thus, a single controller may coordinate the power command and the post ignition command. However, the control circuit may be two control circuits configured to communicate to each other. For instance, one control circuit may be configured to control the heater circuit 210 and the far post injection circuit 218, and a second control circuit is configured to control the close post injection circuit 212. In various embodiments with two controllers, there may be one control circuit in one controller and a second control circuit in a second controller, wherein one control circuit is configured to control the heater circuit 210 and the far post injection circuit 218, and a second control circuit is configured to control the close post injection circuit 212. In the cases where the heater circuit 210, the close post injection circuit 212, and the far post injection circuit 218 are not controlled by the same control system, the heater circuit 210 and the far post injection circuit 218 may be pair together. However, any combination may be effective.

A chaining sequence is used in order to allow the control circuit 214 to determine the order of operations. The chaining sequence, or chaining rule, provides one commands until it saturates and then provides the second command if the set-point is not attained. By allowing one operation at a time, the control circuit 214 reduces any conflict, inefficiencies, and potential error from redundant efforts. For instance, the control circuit 214 first communicates with the heater circuit 210 and commands the heater circuit 210 to operate normally. Simultaneously, the control circuit 214 commands the far post injection circuit 218 to pause its operations. The heater circuit 210 then communicates whether the goal of meeting the predefined threshold temperature has been achieved. Then once the capabilities of the heater 106 have been exhausted, the control circuit 214 communicates with the far post injection circuit 218 to move forward with normal functions, if necessary. Alternatively, the control circuit 214 may correspond with the far post injection circuit 218 first and the heater circuit 210 subsequently, depending on the data returned by the far post injection circuit 218. Additionally, the chain sequence includes communication with the close post injection circuit 212 in the necessary order determined.

These chaining sequence order and commands include, but are not limited to, instructions to alter the chaining sequence based on battery state, fuel level, and whether the actual gas temperature is above or below the predefined threshold. For instance, if the system 100 includes a battery (e.g., to power the electric heater) the control circuit 214 determines whether there is enough charge in the battery to use the heater and for how long. The control circuit 214 evaluates the sufficiency of state of charge (SOC) based on whether the SOC is at or below a predetermined threshold charge value. If the SOC is above the predetermined threshold charge value (e.g., 50% or more), the control circuit 214 may decide to run the heater circuit 210 first. Additionally, the control circuit 214 may analyze the fuel level based on a predetermined threshold fuel level to determine whether it is at or below the predetermined threshold fuel level (e.g., 50%) and thus the fuel should be preserved, or whether there is enough fuel to burn in a post injection. Further, the control circuit 215 can evaluate the fuel level and the SOC simultaneously. For instance, when the fuel level is at 30% and the SOC is at 40%, the control circuit 214 determines both the fuel level and the SOC are below their respective threshold values and commands the heater 106 to activate because the SOC is higher than the fuel level. Lastly, the control circuit 214 can determine whether the actual gas temperature is above or below the predefined threshold. If the gas temperature is above, for instance, the control circuit 214 may opt to forego either the heater circuit 210, the close post injection circuit 212, and/or the far post injection circuit 218.

Figure 8:
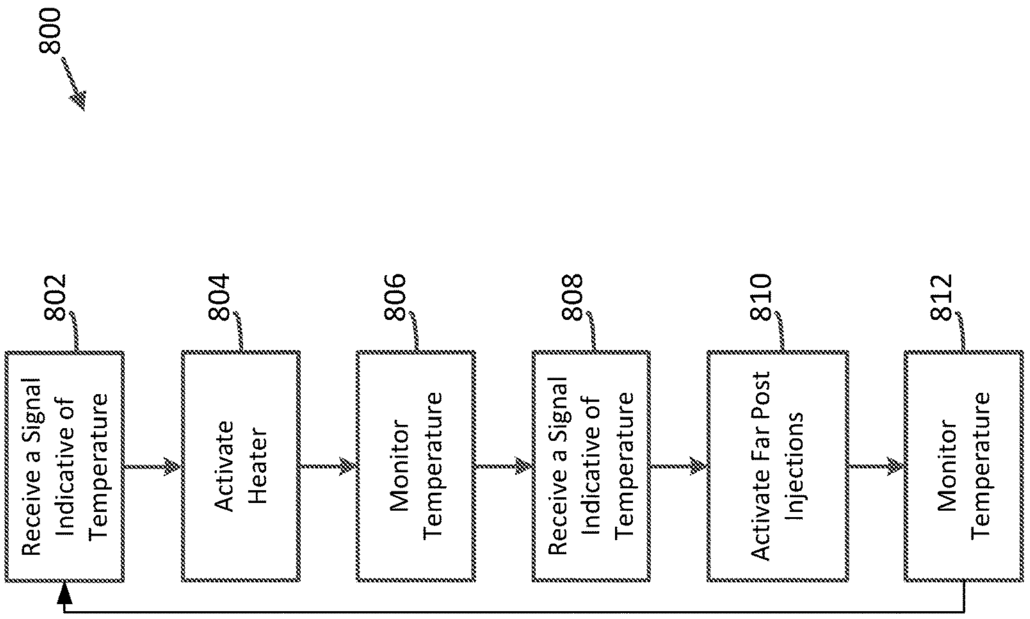
FIG. 8 is a flow diagram of another method of controlling a catalyst temperature of the system of FIG. 5, according to an example embodiment.

Referring now to FIG. 8, a method 800 for controlling a catalyst temperature with coordinated control of the heater outlet temperature (i.e., DOC inlet temperature) using the engine 102 (far post injection) and the heater 106 is shown, according to an exemplary embodiment. The method may be performed by the components of FIGS. 5-7, such that reference may be made to them to aid explanation of the method 800. It should be noted that due the chaining sequence as described herein, the method 800 is exemplary and the order of operations may vary in other embodiments.

At step 802, a command to activate the heater 106 is received. This command may come from the controller 108 based on the inlet heater temperature sensor 110, the outlet heater temperature sensor 112, the SCR-out temperature sensor 114, and/or the DOC-in temperature sensor 116. The controller 108 determines via the temperature reading received from the temperature sensors whether the exhaust gas temperature is at or below a threshold temperature level. For example, the predefined threshold temperature may be between 200 degrees C. and 500 degrees C. If the temperature is below the threshold level such as a water freezing temperature, this may indicate inadequate catalyst heating. As such and based on this determination, the heater circuit 210 activates the heater 106 to start at step 804. At step 806, the temperature sensors 110, 112, 114, and 116 may monitor the exhaust gas temperature. At this step, the heater circuit 210 may modulate the command to increase or decrease the heater power, or turn off the heater 106, depending on the target temperature and the actual temperature. At step 808, the temperature signal is received by the controller 108 to determine next steps. If the controller 108 determines the exhaust gas temperature is at or below a predefined threshold value, the far post injection circuit 218 commands the engine 102 (i.e., the designated fuel injectors) for far post injections at step 810. Further, the controller 108 may control the heater 106 to cease heating concurrently or nearly concurrently with the far post injections. Fuel may then be injected to heat the exhaust gas. At step 812, the inlet heater temperature sensor 110, the outlet heater temperature sensor 112, the SCR-out temperature sensor 114, and/or the DOC-in temperature sensor 116 monitor the temperature again to determine whether the exhaust gas is at or below the predefined threshold value. If the exhaust gas is below the threshold value, the method 800 may be repeated. If the exhaust gas is at or above the predefined threshold value, proper catalyst heating is indicated.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 3 and 7, it should be understood that the controller 108 may include any number of circuits for completing the functions described herein. For example, the activities and functionalities of the heater circuit 210, the close post injection circuit 212, the control circuit 214, and the far post injection circuit 218 may be combined in multiple circuits or as a single circuit. Additional circuits with additional functionality may also be included. Further, the controller 108 may further control other activity beyond the scope of the present disclosure.

As mentioned above and in one configuration, the "circuits" may be implemented in machine-readable medium for execution by various types of processors, such as the processor 204 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:

an aftertreatment system coupled to an engine;

a heater;

at least one sensor configured to determine an exhaust gas temperature; and at least one processing circuit structured to:

determine whether the exhaust gas temperature is at or below a predefined threshold temperature;

provide a first command to control the heater in response to the exhaust gas temperature being at or below the predefined threshold temperature;

selectively provide a second command to increase the exhaust gas temperature; and coordinate the first and second commands, wherein the first command is provided followed by the second command only if the predefined threshold temperature is not attained by the first command.

2. The system of claim 1, wherein the aftertreatment system comprises a catalyst.

3. The system of claim 2, wherein the catalyst is at least one of a selective catalytic reduction (SCR) catalyst or a diesel oxidation catalyst (DOC).

4. The system of claim 1, wherein the heater is positioned downstream of the engine and upstream of the catalyst.

5. The system of claim 1, wherein the at least one sensor includes a first sensor coupled to an inlet of the heater, a second sensor coupled to an outlet of the heater, and a third sensor coupled to an outlet of a catalyst of the aftertreatment system.

6. The system of claim 1, wherein the at least one processing circuit is further structured to coordinate the first and second commands using a multivariable model, the multivariable model comprising at least one temperature input determined by the at least one sensor, at least one predicted temperature output, a close post injection quantity parameter, a close post injection timing parameter, or a power expended to the heater.

7. The system of claim 1, wherein the at least one processing circuit is further structured to alter the first and second commands depending on at least one of a battery state or a fuel level.

8. The system of claim 1, wherein the at least one processing circuit is further structured to alter the first and second commands based on whether the exhaust gas temperature is above or below the predefined threshold temperature.

9. The system of claim 1, wherein the at least one processing circuit is further structured to modulate control of the heater as a function of the predefined threshold temperature and an actual temperature.

10. A system, comprising:

at least one controller structured to:

determine whether an exhaust gas temperature is at or below a predefined threshold temperature;

provide a first command to control a heater in response to the exhaust gas temperature being at or below the predefined threshold temperature;

provide a second command to increase the exhaust gas temperature; and coordinate the first and second commands, wherein the first command is provided followed by the second command only if the predefined threshold temperature is not attained by the first command.

11. The system of claim 10, wherein the second command is a post injection command, wherein the post injection command is at least one of:

a close post injection when the heater is positioned downstream of an engine and upstream of a diesel oxidation catalyst (DOC); or a far post injection when the heater is positioned downstream of the DOC and upstream of a selective catalytic reduction (SCR) system.

12. The system of claim 10, wherein the at least one controller is further structured to modulate control of the heater as a function of the predefined threshold temperature and an actual temperature.

13. The system of claim 10, wherein the at least one controller is further structured to coordinate the first and second commands using a multivariable model, the multivariable model comprising at least one temperature input determined by the at least one sensor, at least one predicted temperature output, a close post injection quantity parameter, a close post injection timing parameter, or a power expended to the heater.

14. A method, comprising:

determining that an exhaust gas temperature is at or below a predefined threshold temperature; and determining a sequence of commands, the sequence of commands including:

providing a first command to control a heater responsive to determining that the exhaust gas temperature is at or below the predefined threshold temperature; and selectively providing a second command to increase the exhaust gas temperature.

15. The method of claim 14, further comprising modulating control of the heater as a function of the predefined threshold temperature and an actual temperature.

16. The method of claim 14, wherein determining that the exhaust gas temperature is at or below the predefined threshold temperature is responsive to receiving information indicative of the exhaust gas temperature.

17. The method of claim 14, wherein the second command is a post injection, wherein the post injection is one of:

a close post injection when the heater is positioned downstream of an engine and upstream of a diesel oxidation catalyst (DOC); or a far post injection when the heater is positioned downstream of the DOC and upstream of a selective catalytic reduction (SCR) system.

18. The method of claim 17, further comprising deactivating the post injection in response to the exhaust gas temperature being at or above the predefined threshold temperature.

19. The method of claim 14, further comprising deactivating the heater in response to the exhaust gas temperature being at or above the predefined threshold temperature.

20. The method of claim 14, further comprising coordinating the first and second commands, wherein the first command is provided followed by the second command only if the predefined threshold temperature is not attained by the first command.

* * * * *